(12) United States Patent
Jenkins et al.

(10) Patent No.: US 11,936,100 B2
(45) Date of Patent: Mar. 19, 2024

(54) SYSTEM AND METHOD FOR 3D-PRINTED OPTICAL LENS WITH IN-SITU ANTENNA

(71) Applicant: Meta Platforms Technologies, LLC, Menlo Park, CA (US)

(72) Inventors: Kurt Jenkins, Sammamish, WA (US); Sandro Pintz, Menlo Park, CA (US); Joseph O'keeffe, Douglas (IE)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 205 days.

(21) Appl. No.: 17/696,633

(22) Filed: Mar. 16, 2022

(65) Prior Publication Data
US 2023/0299470 A1    Sep. 21, 2023

(51) Int. Cl.
| | |
|---|---|
| *H01Q 1/27* | (2006.01) |
| *B33Y 10/00* | (2015.01) |
| *B33Y 30/00* | (2015.01) |
| *B33Y 80/00* | (2015.01) |
| *G02B 27/01* | (2006.01) |
| *H01Q 7/00* | (2006.01) |
| *B29C 64/124* | (2017.01) |

(52) U.S. Cl.
CPC .............. *H01Q 1/273* (2013.01); *B33Y 10/00* (2014.12); *B33Y 30/00* (2014.12); *B33Y 80/00* (2014.12); *G02B 27/0172* (2013.01); *H01Q 7/00* (2013.01); *B29C 64/124* (2017.08)

(58) Field of Classification Search
CPC ...... H01Q 1/22–24; H01Q 1/44; H01Q 1/273; H01Q 1/38; H01Q 7/00; B33Y 10/00; B33Y 30/00; B33Y 80/00
See application file for complete search history.

(56) References Cited

U.S. PATENT DOCUMENTS

| | | | | |
|---|---|---|---|---|
| 11,237,412 B1* | 2/2022 | Olgun | ...................... | H01Q 1/44 |
| 2023/0099937 A1* | 3/2023 | Jadidian | ................... | H01Q 1/38 |
| | | | | 343/718 |

* cited by examiner

*Primary Examiner* — Hasan Islam
(74) *Attorney, Agent, or Firm* — MANNAVA & KANG, P.C.

(57) ABSTRACT

According to examples, a lens configuration for a head-mounted display (HMD) device may include a base platform made from glass or plastic, an antenna layer deposited onto the base platform, an optical polymer film deposited onto the antenna layer, and a lens layer deposited onto the optical polymer film through a 3D printing technique. The antenna layer may include a transparent antenna embedded into or deposited onto a transparent layer. The lens layer may be 3D printed as multiple partial layers to have a shape that matches a prescription for the lens layer.

20 Claims, 7 Drawing Sheets

SYSTEM AND METHOD FOR 3D-PRINTED OPTICAL LENS WITH IN-SITU ANTENNA

TECHNICAL FIELD

This patent application relates generally to head-mount display (HMD) devices, and more specifically, to systems and methods for providing a head-mount display (HMD) using a 3D-printed optical lens with in-situ antenna in a lens stack.

BACKGROUND

Head-mount display (HMD) devices such as glasses for virtual reality (VR), augmented reality (AR), and mixed reality (MR) systems may display content by projection onto a pair of see-through lenses. Thus, when the virtual reality (VR), augmented reality (AR), and mixed reality (MR) system is not in use, a user can see their environment, or in case of augmented reality (AR) and mixed reality (MR), content may be superimposed onto the real scene around the user.

Such head-mount display (HMD) devices may include a number of electronic subs-systems and may be communicatively coupled to another device such as a console, a computer, or a server. Communication between the head-mount display (HMD) device and the other device may be wireless and require presence of an antenna. In smaller form head-mount display (HMD) devices such as glasses, form and functionality characteristics restrict placement and form of an antenna that can be placed on or embedded in the glasses. If the antenna does not have optimal form (e.g., style and/or size) or its performance is affected by its placement, wireless communication, and thereby, performance of the head-mount display (HMD) device may degrade.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
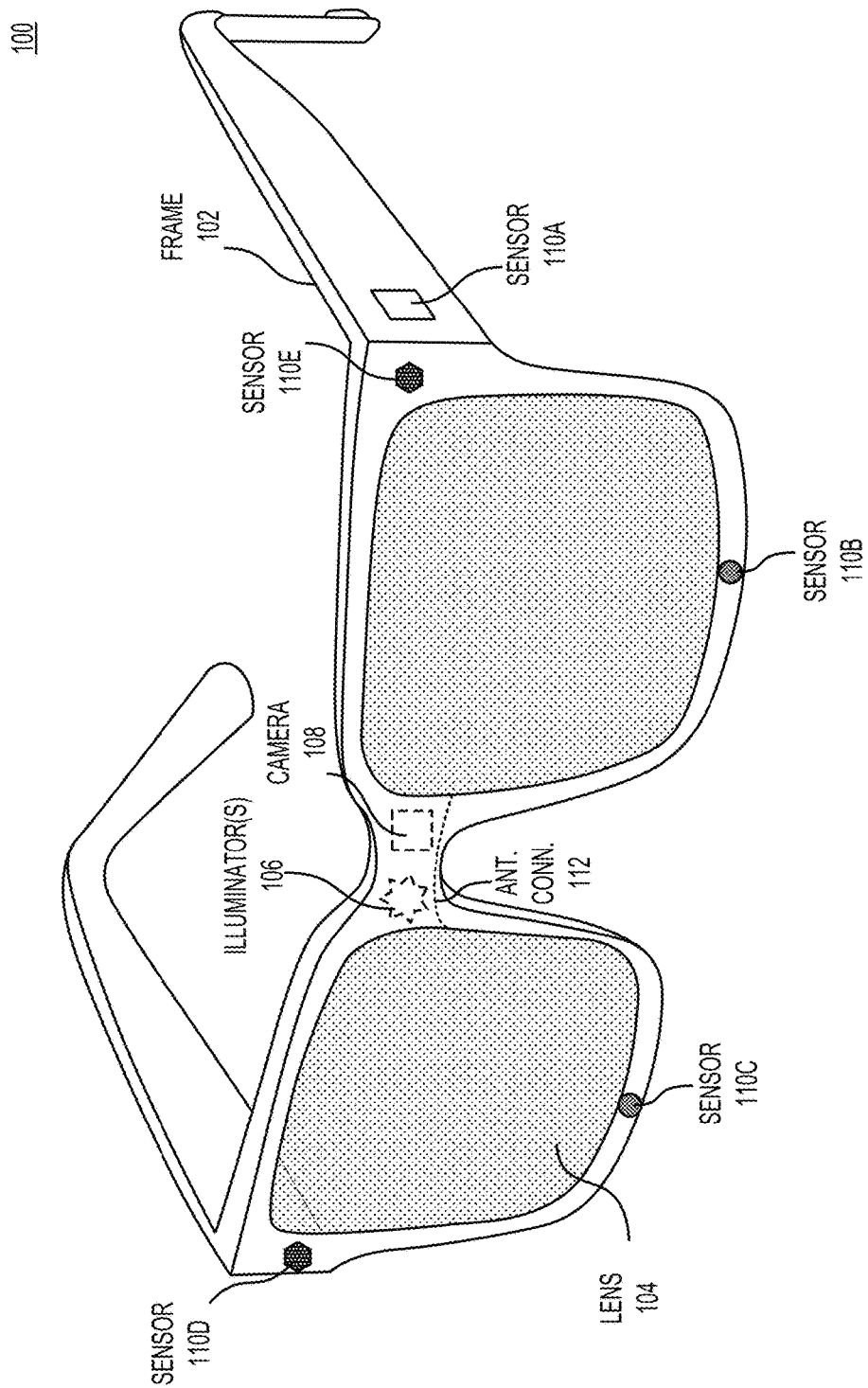
FIG. 1 illustrates a perspective view of a head-mount display (HMD) device in the form of a pair of glasses (or other similar eyewear), where an antenna may be incorporated into a lens stack, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Head-mount display (HMD) devices such as glasses for virtual reality (VR), augmented reality (AR), and mixed reality (MR) systems may display content by projection onto a pair of see-through lenses. Communication between the head-mount display (HMD) device and the other device may be wireless and require presence of an antenna. In smaller form head-mount display (HMD) devices such as glasses, form and functionality characteristics restrict placement and form of an antenna that can be placed on or embedded in the glasses. If the antenna does not have optimal form (e.g., style and/or size) or its performance is affected by its placement, wireless communication, and thereby, performance of the head-mount display (HMD) device may degrade.

Disclosed herein are systems, apparatuses, and methods that may provide antenna placement on head-mount display (HMD) devices, and more specifically, for providing a head-mount display (HMD) using a 3D-printed optical lens with in-situ antenna in a lens stack. A lens stack (or a lens configuration), according to some examples, may include a base platform made from glass, plastic, or similar transparent material, an antenna layer, and a lens layer. The antenna layer may include an antenna of any shape made from transparent material or following a contour of the base platform. Thus, the lens stack may be a see-through combination of layers with (or without) a prescription for a user.

In some examples, the lens layer may be 3D printed onto the antenna layer using any suitable 3D printing technique. The prescription may be included through a shape of the lens layer or through a combination of the shapes of the lens layer and the base platform. The antenna may be electrically connected to circuitry on the head-mount display (HMD) device through a pair of wires placed on or embedded into a portion of the head-mount display (HMD) device such as a bridge of a pair of glasses. In other examples, the antenna may also be printed (e.g., by a 3D printer) onto the base platform. In some examples, some circuitry such as input circuitry, amplifier circuitry, and similar ones may also be included in the antenna layer using transparent material.

By providing antenna placement in a lens stack for a head-mount display (HMD) device, antenna efficiency may be improved by using a larger antenna without impact of nearby components of the head-mount display (HMD) device. Mechanical stress on the antenna may be reduced, for example, compared to having the antenna on the frame or other parts of the head-mount display (HMD) device. the lens stack with the antenna may also be thinner than comparable arrangements such as laminated antenna. Other benefits and advantages may also be apparent.

FIG. 1 illustrates a perspective view of a head-mount display (HMD) device 100 in the form of a pair of glasses (or other similar eyewear), where an antenna may be incorporated into a lens stack, according to an example. As used herein, a "lens" or an "optical lens" may refer to any transmissive optical device made from plastic, polycarbonates, or similar materials using molding, casting, 3D printing, and similar techniques. As used herein, "3D" may refer to three-dimensional in context of scanning and/or printing contrasted with two-dimensional, planar scanning or printing, where three-dimensional features of an object can be detected or created.

As shown FIG. 1, a head-mount display (HMD) device 100 (e.g., a near-eye display) in the form of a pair of glasses (or other similar eyewear) may be a part of a virtual reality (VR) system, an augmented reality (AR) system, a mixed reality (MR) system, another system that uses displays or wearables, or any combination thereof. In some examples, the head-mount display (HMD) device 100 may include a frame 102 and a display 104. In some examples, the display 104 may be configured to present media or other content to a user. In some examples, the display 104 may include display electronics and/or display optics, similar to components. For example, the display 104 may include a liquid crystal display (LCD) display panel, a light-emitting diode (LED) display panel, or an optical display panel (e.g., a waveguide display assembly). In some examples, the display 104 may also include any number of optical components, such as waveguides, gratings, lenses, mirrors, etc.

In some examples, the head-mount display (HMD) device 100 may further include various sensors 110a, 110b, 110c, 110d, and 110e on or within the frame 102. In some examples, the various sensors 110a-110e may include any number of depth sensors, motion sensors, position sensors, inertial sensors, and/or ambient light sensors, as shown. In some examples, the various sensors 110a-110e may include any number of image sensors configured to generate image data representing different fields of views in one or more different directions. In some examples, the various sensors 110a-110e may be used as input devices to control or influence the displayed content of the head-mount display (HMD) device 100, and/or to provide an interactive virtual reality (VR), augmented reality (AR), and/or mixed reality (MR) experience to a user of the head-mount display (HMD) device 100. In some examples, the various sensors 110a-110e may also be used for stereoscopic imaging or other similar application.

In some examples, the head-mount display (HMD) device 100 may further include one or more illuminator(s) 106 to project light into a physical environment. The projected light may be associated with different frequency bands (e.g., visible light, infra-red light, ultra-violet light, etc.), and may serve various purposes. In some examples, the one or more illuminator(s) 106 may be used as locators.

In some examples, the head-mount display (HMD) device 100 may also include a camera 108 or other image capture unit. The camera 108, for instance, may capture images of the physical environment in the field of view. In some instances, the captured images may be processed, for example, by a virtual reality engine to add virtual objects to the captured images or modify physical objects in the captured images, and the processed images may be displayed to the user by the display 104 for augmented reality (AR) and/or mixed reality (MR) applications.

In some examples, the head-mount display (HMD) device 100 may receive content to be displayed from another device such as a computer, a server, a console, or similar via wired or wireless transmission. The head-mount display (HMD) device 100 may also capture images or video through the camera 108 and transmit captured images or video (or any other information) to other devices. In case of wireless transmission, the head-mount display (HMD) device 100 may have an antenna and a transceiver to perform the wireless communication. As discussed herein, for a head-mount display (HMD) device in form of a pair of glasses, placement of the antenna (and transceiver) may be challenging due to form and functionality limitations.

In some examples, the display 104 may include a lens stack to allow the head-mount display (HMD) device 100 to be used as a regular pair of glasses and a user to see through them. An optical lens is a transmissive optical device which focuses or disperses a light beam by means of refraction. A simple optical lens consists of a single piece of transparent material, while a compound optical lens consists of several simple lenses (elements), usually arranged along a common axis. Optical lenses are made from materials such as glass or plastic (e.g., monomers, polymers, polycarbonates), and are ground and polished or molded to a particular predetermined shape. An optical lens can focus light to form an image.

In some examples, the lens stack included in the display 104 may include a transparent base platform (glass or plastic), an antenna, and a 3D-printed lens to allow the lens stack to perform regular eyeglass lens functionality, while also serving as a location for the antenna. In some examples, the antenna may be electrically coupled to a transceiver embedded in the frame 102 through one or more wires embedded in the frame 102 or a bridge of the frame 102.

Figure 2:
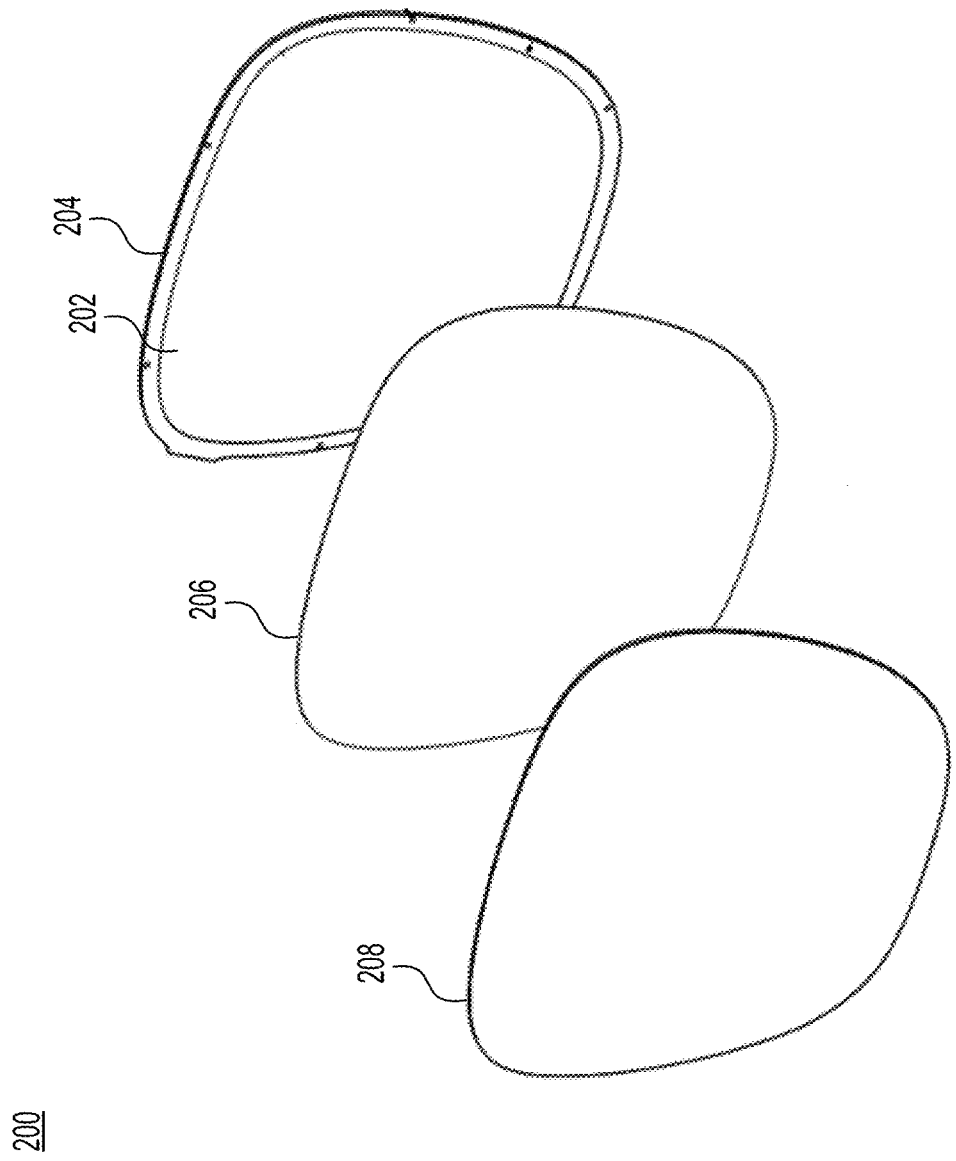
FIG. 2 illustrates a stack of base platform, antenna layer, and 3D-printed lens layer, according to an example.

FIG. 2 illustrates a stack of base platform, antenna layer, and 3D-printed lens layer, according to an example. Diagram 200 in FIG. 2 shows a base platform 202, a mask border 204 for the base platform, an antenna layer 206, and a lens layer 208.

In some examples, the base platform 202 may include any suitable optical material, but are not limited to, glass, optical grade plastics such as poly-methyl-methacrylate (PMMA), cyclic-olefin-copolymer (COC), cyclo-olefin-polymer (COP), monomer plastic, polymer plastic, polycarbonate (PC), epoxy, polyester, optical nylon, etc. The base platform 202 may be provided using casting, injection molding, compression molding, machining, polishing, and/or similar methods or techniques.

In some examples, the antenna layer 206 may include a transparent thin layer a suitable material such as poly-methyl-methacrylate (PMMA), cyclic-olefin-copolymer (COC), cyclo-olefin-polymer (COP), monomer plastic, polymer plastic, polycarbonate (PC), or optical nylon with the antenna material printed onto or embedded into the thin layer. The antenna material may be a suitable transparent electrode and screen-printed, embedded, 3D-printed, or provided through lithography onto the thin layer. The antenna layer 206 may be pressed on, glued on, or laminated onto the base platform 202. Yet, in other examples, the antenna layer 206 may be held in place by the mask border 204 for the base platform.

In some examples, the lens layer 208 may be 3D printed onto the antenna layer 206 by a 3D printer using any suitable material such as poly-methyl-methacrylate (PMMA), cyclic-olefin-copolymer (COC), cyclo-olefin-polymer (COP), monomer plastic, polymer plastic, or polycarbonate (PC). As discussed in more detail in conjunction with FIGS. 4 and 5, the lens layer 208 may be formed by small droplets being deposited onto the antenna layer 206 by a nozzle of a 3D printer. Size of the droplets and/or viscosity of the print material may be selected depending on a particular thickness and prescription of the lens layer 208.

In some examples, a thin (e.g., 5-10 micrometers) optical polymer film may be applied onto a surface of the antenna layer 206, and the lens layer 208 may be printed onto the optical polymer film for enhanced adhesion. In some examples, the optical polymer film and the transparent thin film of the antenna layer 206 may be the same. For example, the optical polymer film may be printed on or embedded with the antenna, and the lens layer 208 printed on the combined optical polymer antenna layer. In other examples, the lens layer 208 may also be printed onto an opposite surface of the base platform 202 such that the base platform 202 is sandwiched between the lens layer 208 and the antenna layer 206.

The materials and configurations described herein are for illustration purposes and do not impose a limitation on example implementations. Other materials and configurations may be implemented using the principles described herein. For example, additional layers such as a reflective or non-reflective layer may be applied to a surface of the lens stack, additional (transparent) circuitry layers may be sandwiched between the lens layer 208 and the base platform 202, etc.

Figure 3:
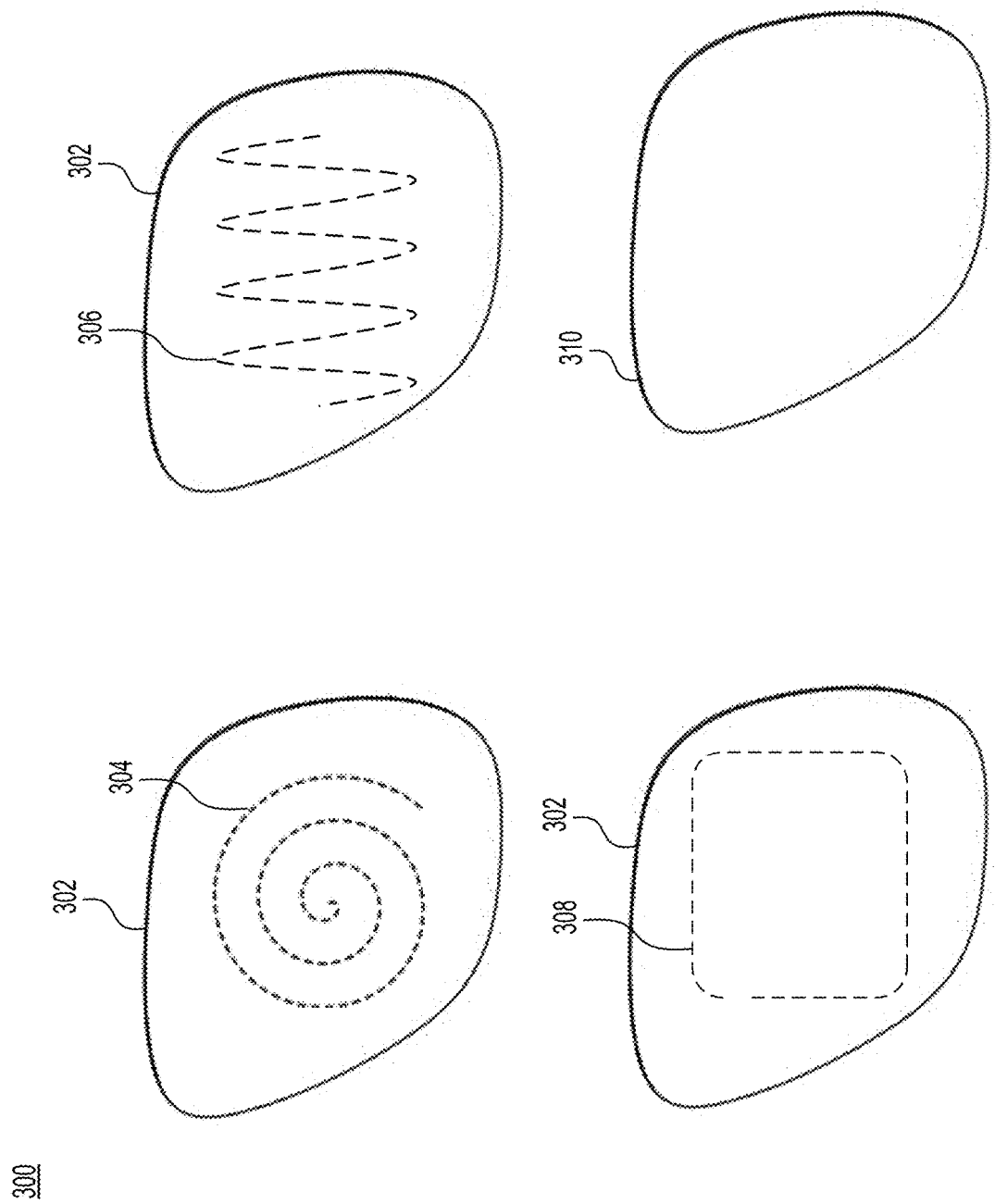
FIG. 3 illustrates example antenna types that may be incorporated into lens stacks of head-mounted display (HMD) devices, according to an example.

FIG. 3 illustrates example antenna types that may be incorporated into lens stacks of head-mounted display (HMD) devices, according to an example. Diagram 300 in FIG. 3 shows an antenna layer 302 with a spiral antenna 304, a planar helical antenna 306, and a loop antenna 308, as well as a loop antenna 310 following a contour of the antenna layer 302.

An antenna on a head-mounted display (HMD) device may be used to communicate with a nearby wireless device (near-field communications), with a wireless network (e.g., wireless local area network "WLAN"), or even longer distance communication (e.g., global positioning system "GPS" satellite communication or a large area wireless network). Thus, a shape and form of the antenna may be selected based on communication needs and device characteristics such as shape and construction of the head-mounted display (HMD) device. As mentioned herein, antennas embedded into a lens stack may allow larger antenna size, reduced interference from other parts of the head-mounted display (HMD) device, among other advantages. Being embedded into the lens stack, however, the antenna may be made from transparent material (also referred to as transparent electrode "TE" material).

In some examples, the antenna may be made from transparent silver nanowire (AgNW), indium tin oxide (ITO), conductive carbon nanotube, or similar material. The antenna may be screen-printed, or 3D printed onto a transparent film such as flexible (or rigid) polyethylene terephthalate (PET) substrate. Transparent films with a low sheet resistance of 8.5 Ωsq-1 and a high transmittance of 85% may be characterized as bowtie antennas with a radiation efficiency exceeding 50%. This combination of efficiency and transmittance may rival conductive oxide based transparent antennas. Among the example implementations, silver nanowire (AgNW)-based antennas may provide chemical and mechanical stability allowing durability against exposure to ambient environmental conditions. An additional advantage of example lens stack implementations may include sandwiching of the antenna layer between the lens layer and the base platform, which may further protect the antenna layer and increase long term durability.

In some examples, the antenna shape may be selected based on communication needs such as polarization, antenna gain, etc. Thus, different antenna shapes such as the spiral antenna 304, planar helical antenna 306, or loop antenna 308 may be selected for different implementations. In other examples, two antennas may be used in the same antenna layer for as alternatives (e.g., spiral antenna 304 and loop antenna 308). Differently from the other shown antenna types, the loop antenna 310 may be placed along a perimeter of the base platform (e.g., in the mask border 204 of the base platform), and therefore, may not have to be transparent (e.g., a wire antenna). In addition to the illustrated examples, the antenna may also have a grid structure.

In some examples, the antenna may be screen printed or 3D printed onto a transparent layer as mentioned herein. Thus, a multi-stage 3D printing system may be used to print the antenna and the lens layer. In some examples, the antenna layer 302 may also include some circuitry. For example, an amplifier, a filter, or similar circuitry, whose placement near the antenna may benefit an overall performance of the communication system, may be implemented using transparent material on the antenna layer 302. Other example circuitry may include, but are not limited to, eye-tracking circuitry, vertical-cavity surface-emitting lasers (VCSELs), indicator lights, etc.

Figure 4:
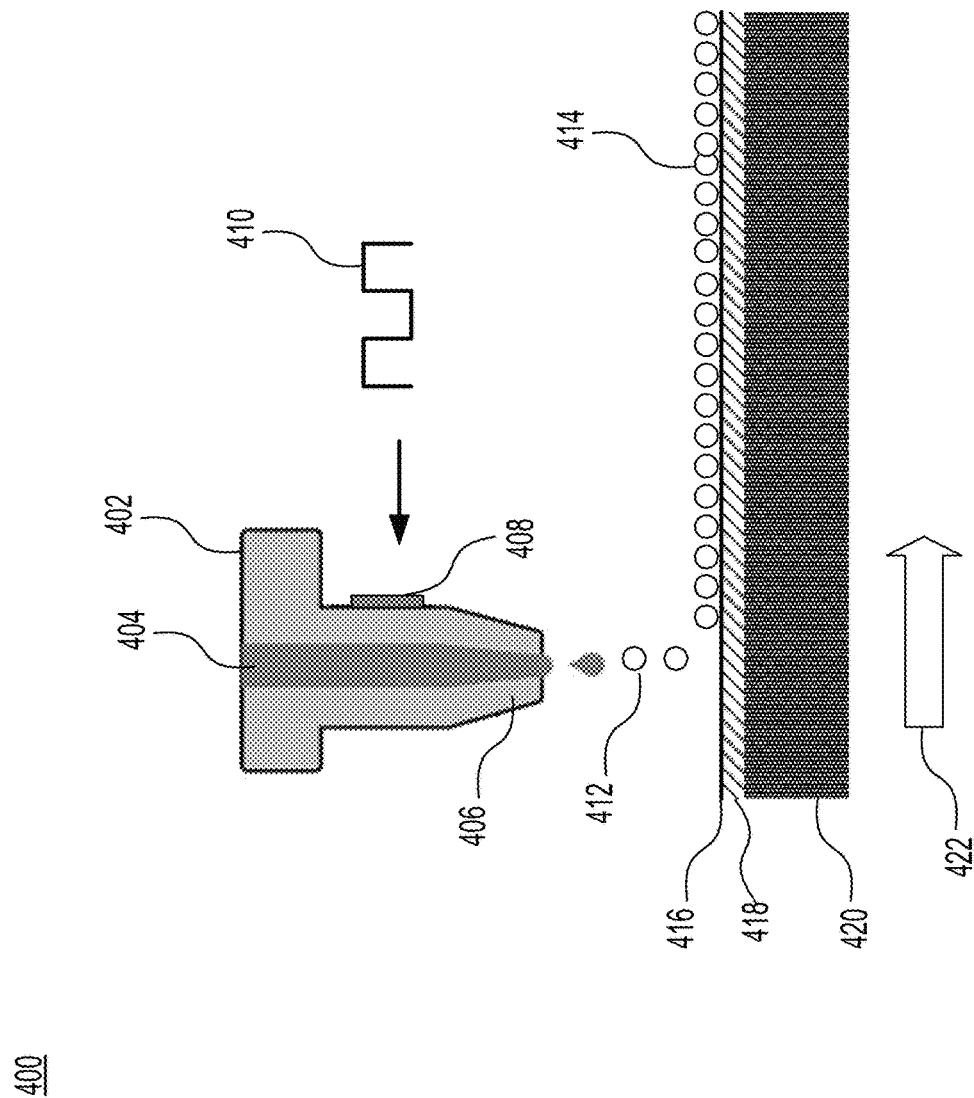
FIG. 4 illustrates 3D printing of a lens layer over a lens stack that includes a base platform and an antenna layer, according to an example.

FIG. 4 illustrates 3D printing of a lens layer over a lens stack that includes a base platform and an antenna layer, according to an example. Diagram 400 in FIG. 4 shows a nozzle 406 of an inkjet type 3D printer 402, where ink 404 (print material such as polymer or polycarbonate) is liquified and flows through the nozzle 406. The flowing print material drops onto an optical polymer film 416 as droplets 412 forming layers 414 (one layer is shown in the diagram for simplicity) of the lens layer. The optical polymer film 416 may be on an antenna layer 418, which in turn may be on a base platform 420. The stack of layers may be moved 422 linearly or planarly as the droplets 412 fall allowing a layer of print material with a thickness of one droplet to be formed on the optical polymer film 416. A piezoelectric transducer 408 actuated by a pulse voltage 410 may generate a pressure pulse causing the droplets 412 to be ejected by the nozzle 406. Coordination between the electronics of the 3D printer and a motion system may enable digital patterning of complex layouts on planar surfaces.

In some examples, the print material (e.g., ink 404) may be liquified prior to being provided to the nozzle 506 and cured (e.g., through photo-curing or cooling) on the optical polymer film 416. In other examples, the print material may be liquified inside the nozzle by applying heat. In an example 3D printer for corrective overprinting of optical lenses, picoliter size droplets may be ejected by the nozzle 406 resulting in a layer thickness ranging from sub-micrometers to 10 micrometers. In some examples, the lens layer may be formed by using photo-cured polymers.

As mentioned herein, the lens layer may be formed by multiple passes of the nozzle 406 forming multiple individual layers. The individual layers may be partial layers, in some examples. Thus, by leaving gaps in various places for individual layers, the 3D printer may form the lens layer according to a predetermined shape, which may be determined from the prescription of the lens.

Figure 5:
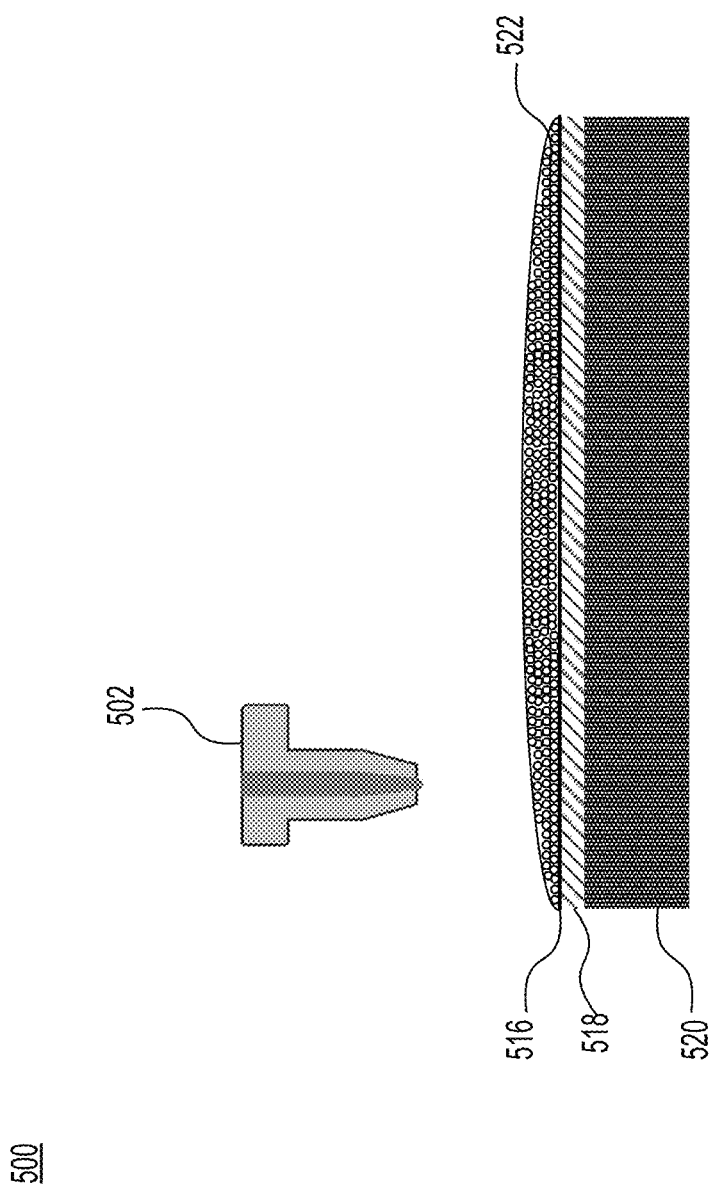
FIG. 5 illustrates a cross-sectional view of a 3D-printed lens over a lens stack that includes a base platform and an antenna layer, according to an example.

FIG. 5 illustrates a cross-sectional view of a 3D-printed lens over a lens stack that includes a base platform and an antenna layer, according to an example. Diagram 500 in FIG. 5 shows 3D inkjet printer 502 and a completed lens stack with base platform 520, antenna layer 518, optical polymer film 516, and lens layer 522.

In some examples, the lens layer 522 may be formed by printing a number of individual (and partial) layers. For example, each individual layer may have a thickness in a range from sub-micrometers to about 10 micrometers. A size of the droplets (thereby a thickness of the individual layers) may be selected based on an overall thickness of the lens stack and/or a thickness of the lens layer 522.

In some examples, the lens layer 522 may be printed through stereolithography "SLA" (e.g., using ultra-violet "UV" lasers as light source to cure the deposited polymer), digital light processing "DLP" (e.g., using a digital projector as a UV light source to cure the polymer), liquid crystal display "LCD" (e.g., using an LCD display to project light for curing the polymer), inkjet deposition, and/or similar techniques.

As discussed herein, a shape of the lens layer 522 may be designed to match a prescription for the lens. Thus, the individual layers may be printed as partial layers to form the shape, in some examples. In other examples, the prescription may be reflected by a shape of the entire lens stack. Thus, the shape of the lens layer 522 may be designed in conjunction with a shape of the base platform 520. Yet in other examples, the base platform 520 may have a shape to reflect the prescription and the lens layer 522 may have uniform thickness.

Figure 6:
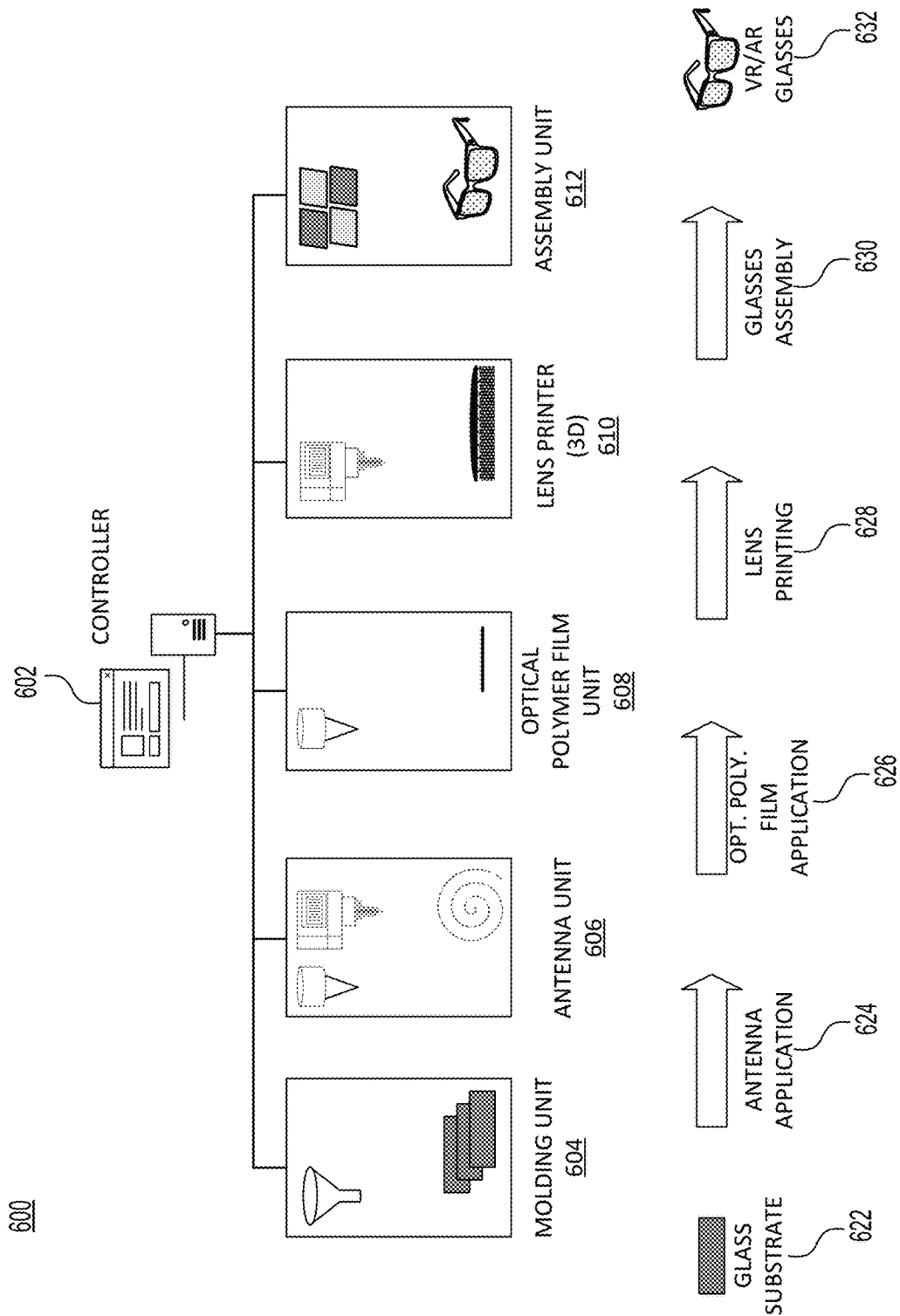
FIG. 6 illustrates a system for providing a head-mount display (HMD) using a 3D-printed optical lens with in-situ antenna in a lens stack, according to an example.

FIG. 6 illustrates a system for providing a head-mount display (HMD) using a 3D-printed optical lens with in-situ antenna in a lens stack, according to an example. Head-mounted display (HMD) device assembly system 600 includes a controller 602, a molding unit 604 (e.g., a molding machine or a casting machine), an antenna unit 606, an optical polymer film applicator 608, a 3D lens printer 610, and an assembly unit 612.

As shown in the head-mounted display (HMD) device assembly system 600, a glass or plastic substrate 622 (base platform) may be provided from the molding unit 604 to the antenna unit 606 for antenna application 624. An optical polymer film may be applied (626) on the antenna layer at the optical polymer film unit 608, and the lens layer may be printed onto the optical polymer film at the 3D lens printer 610. The completed lens stack may be combined with other electronic and mechanical components of the head-mounted display (HMD) device at the assembly unit 612.

Some approaches may employ mold film lamination of an antenna onto a glass substrate, but mold film limitation may be limited in the ability to mold on top of glass due to coefficient of thermal expansion (CTE) mismatch and may exhibit high pressure and heat on the films causing cosmetic and physical damage to the lens and films. In direct lamination, inconsistent thickness of the film may cause bubbles and delamination during degassing and autoclave processes. 3D printing the lens layer together with the glass (or plastic) base platform may provide a robust low stress technique while avoiding additional adhesive/boundary layers.

In some examples, the antenna may also be 3D printed onto a transparent antenna film. In such examples, the antenna unit 606 and the 3D lens printer 610 may be two distinct 3D printers or the same printer (or two different sets of nozzles of the same printer system).

In some examples, the controller 602 may be communicatively coupled through wired or wireless media to the molding unit 604, the antenna unit 606, the optical polymer film unit 608, the 3D lens printer 610, and the assembly unit 612, and control part or all of their operations. For example, the controller 602 may store machine-readable instructions on a non-transitory computer readable medium and execute through a processor or other type of processing circuit to perform one or more operations described herein.

In some examples, the controller 602, the molding unit 604, the antenna unit 606, the optical polymer film unit 608, the 3D lens printer 610, and the assembly unit 612 may be distinct devices or systems that are communicatively coupled. In other examples, the devices or systems may be partially or wholly integrated. A system for providing a head-mount display (HMD) using a 3D-printed optical lens with in-situ antenna in a lens stack may include additional or fewer components with performing additional or similar functionality as described components.

Figure 7:
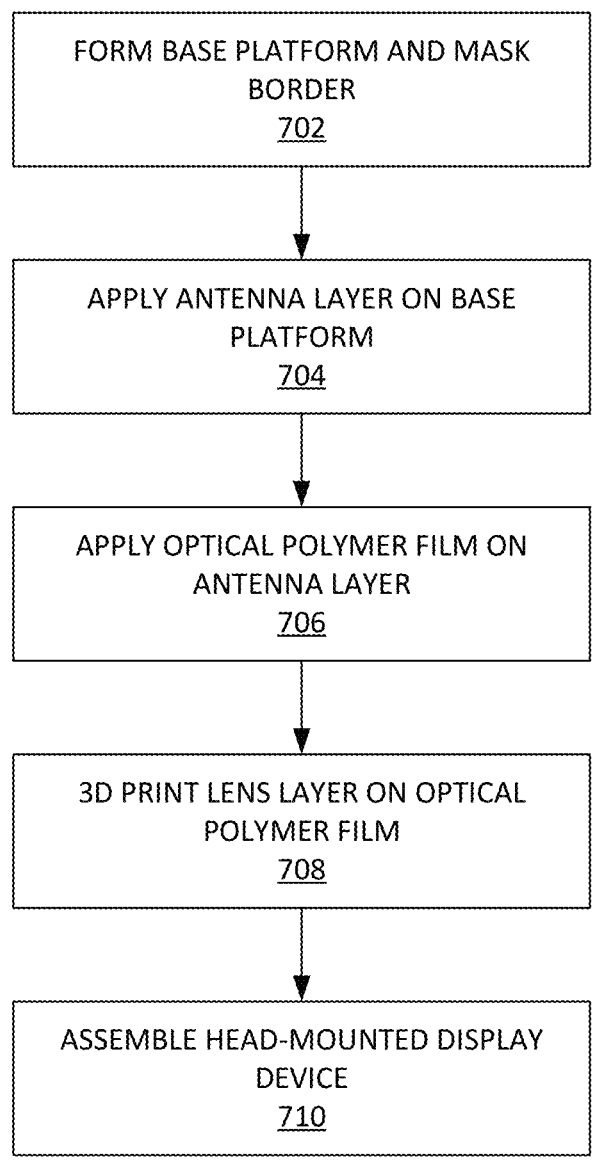
FIG. 7 illustrates a flowchart of a method for providing a head-mounted display (HMD) device (glasses) with an antenna layer and a 3D-printed lens layer, according to an example.

FIG. 7 illustrates a flowchart of a method for providing a head-mounted display (HMD) device (glasses) with an antenna layer and a lens layer, according to an example. Although the method 700 is primarily described as being performed by head-mounted display (HMD) device assembly system 600 that includes a controller 602, a molding unit 604 (e.g., a molding machine or a casting machine), an antenna unit 606, an optical polymer film unit 608, a 3D lens printer 610, and an assembly unit 612, the method 700 may be executed or otherwise performed by other systems, or a combination of systems. Each block shown in FIG. 7 may further represent one or more processes, methods, or subroutines, and one or more of the blocks may include machine-readable instructions stored on a non-transitory computer readable medium and executed by a processor or other type of processing circuit to perform one or more operations described herein.

At optional block 702, the molding unit 604 may form the glass or plastic base platform 420 through injection molding, machine casting, compression molding, or similar techniques. At 704, the antenna unit 606 may apply or print the antenna layer 418 onto the base platform 420. The antenna layer may be formed by embedding, depositing, or printing the antenna onto a transparent film.

At 706, the optical polymer film unit 608 may provide an optical polymer film onto the antenna layer for better adhesion of the lens layer onto the antenna layer. The optical polymer film may be a thin layer (e.g., in the range of 5-10 micrometers). At 708, the 3D lens printer 610 may print the lens layer on the optical polymer film layer-by-layer depositing partial layers to achieve a shape to match a prescription for the lens stack. At 710, the assembly unit 612 may assemble various components of the head-mounted display (HMD) device including the completed lens stack.

According to some examples, a lens configuration for a head-mounted display (HMD) device may include a base platform including a glass or plastic layer; an antenna layer on the base platform, the antenna layer including a transparent film and an antenna; an optical polymer film on the antenna layer; and a lens layer on the optical polymer film through a 3D printing technique.

According to some examples, the antenna may be embedded into, deposited onto, or printed on the transparent film. The antenna may include transparent silver nanowire (AgNW). The antenna may be a wire loop antenna placed along a periphery of the base platform. The antenna layer may further include one or more circuitry embedded into, deposited on, or printed on the transparent film. The lens configuration may further include a mask border formed around a periphery of the base platform, where the mask border is to fasten the antenna layer, the optical polymer film, and the lens layer.

According to some examples, the lens layer may be provided on the optical polymer film by 3D printing a plurality of stacked layers. At least a portion of the plurality of stacked layers may be partial layers, and the 3D printing technique may include selecting a number and a size of the partial layers such that a shape of the lens layer matches a prescription for the lens layer. A size of droplets for the 3D printing technique may be selected at least in part based on a thickness of each of the plurality of stacked layers.

According to some examples, a system for providing a lens configuration for a head-mounted display (HMD) device may include a molding unit to form a base platform including at least one of a glass layer or a plastic layer; an antenna unit to provide an antenna layer on the base platform, the antenna layer including a transparent film and an antenna; an optical polymer film unit to provide an optical polymer film on the antenna layer; and a 3D printer to provide a lens layer on the optical polymer film.

According to some examples, the antenna unit may form the antenna layer through one of embedding the antenna into, depositing the antenna on, or printing the antenna on the transparent film, and the antenna may be one of a planar transparent electrode antenna or a wire loop antenna placed around a periphery of the base platform. The antenna unit may form the antenna layer including the transparent film and at least two antennas.

According to some examples, the 3D printer may provide the lens layer on the optical polymer film by 3D printing a plurality of stacked layers. At least a portion of the plurality of stacked layers may include partial layers, a number and a size of the partial layers may be selected such that a shape of the lens layer matches a prescription for the lens layer, and a size of droplets may be selected at least in part based on a thickness of each of the plurality of stacked layers. The 3D printer may employ one of stereolithography "SLA", digital light processing "DLP", liquid crystal display "LCD", or inkjet deposition.

According to some examples, a method for providing a lens configuration for a head-mounted display (HMD) device may include providing a base platform including a transparent layer; providing an antenna layer on the base platform, the antenna layer including a transparent film and an antenna, where the antenna is embedded into, deposited on, or printed on the transparent film; providing an optical polymer film on the antenna layer; and providing a lens layer on the optical polymer film by 3D printing a plurality of stacked layers.

According to some examples, providing the base platform may include providing the base platform using one of poly-methyl-methacrylate (PMMA), cyclic-olefin-copolymer (COC), cyclo-olefin-polymer (COP), monomer plastic, polymer plastic, polycarbonate (PC), optical nylon, or glass. The method may further include providing the antenna as a planar antenna using transparent silver nanowire (AgNW) or as a wire loop antenna to be placed around a periphery of the base platform. The method may also include providing a mask border around a periphery of the base platform to fasten the antenna layer, the optical polymer film, and the lens layer. 3D printing the plurality of stacked layers may include depositing droplets of at least one of poly-methyl-methacrylate (PMMA), cyclic-olefin-copolymer (COC), cyclo-olefin-polymer (COP), monomer plastic, polymer plastic, polycarbonate (PC), or optical nylon onto the optical polymer film, where a size of the droplets may be selected at least in part based on a thickness of each of the plurality of stacked layers.

Various devices and systems are described herein using example components, configurations, and characteristics. The discussed components, configurations, and characteristics are not intended to be restrictive of example devices and systems. Examples may be implemented with any number of components, configurations, and characteristics using the principles described herein.

In the foregoing description, various inventive examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

The invention claimed is:

1. A lens configuration for a head-mounted display (HMD) device, comprising:
   a base platform comprising a glass or plastic layer;
   an antenna layer on the base platform, the antenna layer comprising a transparent film and an antenna;
   an optical polymer film on the antenna layer; and
   a lens layer on the optical polymer film through a 3D printing technique.

2. The lens configuration of claim 1, wherein the antenna is embedded into, deposited on, or printed on the transparent film.

3. The lens configuration of claim 1, wherein the antenna comprises transparent silver nanowire (AgNW).

4. The lens configuration of claim 1, wherein the antenna is a wire loop antenna placed along a periphery of the base platform.

5. The lens configuration of claim 1, wherein the antenna layer further comprises one or more circuitry embedded into, deposited on, or printed on the transparent film.

6. The lens configuration of claim 1, further comprising:
   a mask border formed around a periphery of the base platform, wherein the mask border is to fasten the antenna layer, the optical polymer film, and the lens layer.

7. The lens configuration of claim 1, wherein the lens layer is provided on the optical polymer film by 3D printing a plurality of stacked layers.

8. The lens configuration of claim 7, wherein at least a portion of the plurality of stacked layers are partial layers, and the 3D printing technique comprises selecting a number and a size of the partial layers such that a shape of the lens layer matches a prescription for the lens layer.

9. The lens configuration of claim 8, wherein a size of droplets for the 3D printing technique is selected at least in part based on a thickness of each of the plurality of stacked layers.

10. A system for providing a lens configuration for a head-mounted display (HMD) device, the system comprising:
    a molding unit to form a base platform comprising at least one of a glass layer or a plastic layer;

an antenna unit to provide an antenna layer on the base platform, the antenna layer comprising a transparent film and an antenna;

an optical polymer film unit to provide an optical polymer film on the antenna layer; and a 3D printer to provide a lens layer on the optical polymer film.

11. The system of claim 10, wherein the antenna unit is to form the antenna layer through one of embedding the antenna into, depositing the antenna on, or printing the antenna on the transparent film, and the antenna is one of a planar transparent electrode antenna or a wire loop antenna placed around a periphery of the base platform.

12. The system of claim 10, wherein the antenna unit is to form the antenna layer comprising the transparent film and at least two antennas.

13. The system of claim 10, wherein the 3D printer is to provide the lens layer on the optical polymer film by 3D printing a plurality of stacked layers.

14. The system of claim 13, wherein at least a portion of the plurality of stacked layers are partial layers, a number and a size of the partial layers are selected such that a shape of the lens layer matches a prescription for the lens layer, and a size of droplets is selected at least in part based on a thickness of each of the plurality of stacked layers.

15. The system of claim 10, wherein the 3D printer employs one of stereolithography "SLA", digital light processing "DLP", liquid crystal display "LCD", or inkjet deposition.

16. A method for providing a lens configuration for a head-mounted display (HMD) device, the method comprising:

providing a base platform comprising a transparent layer;

providing an antenna layer on the base platform, the antenna layer comprising a transparent film and an antenna, wherein the antenna is embedded into, deposited on, or printed on the transparent film;

providing an optical polymer film on the antenna layer; and providing a lens layer on the optical polymer film by 3D printing a plurality of stacked layers.

17. The method of claim 16, wherein providing the base platform comprises:

providing the base platform using one of poly-methyl-methacrylate (PMMA), cyclic-olefin-copolymer (COC), cyclo-olefin-polymer (COP), monomer plastic, polymer plastic, polycarbonate (PC), optical nylon, or glass.

18. The method of claim 16, further comprising:

providing the antenna as a planar antenna using transparent silver nanowire (AgNW) or as a wire loop antenna to be placed around a periphery of the base platform.

19. The method of claim 16, further comprising:

providing a mask border around a periphery of the base platform to fasten the antenna layer, the optical polymer film, and the lens layer.

20. The method of claim 16, wherein 3D printing the plurality of stacked layers comprises:

depositing droplets of at least one of poly-methyl-methacrylate (PMMA), cyclic-olefin-copolymer (COC), cyclo-olefin-polymer (COP), monomer plastic, polymer plastic, polycarbonate (PC), or optical nylon onto the optical polymer film, wherein a size of the droplets is selected at least in part based on a thickness of each of the plurality of stacked layers.

* * * * *